United States Patent
Na et al.

(10) Patent No.: US 12,351,480 B2
(45) Date of Patent: Jul. 8, 2025

(54) APPARATUS AND METHOD FOR CONTROLLING OUTPUT FOR CHEMICAL DOSING OPTIMIZATION FOR WATER TREATMENT PLANT

(71) Applicant: DOOSAN ENERBILITY CO., LTD., Changwon-si (KR)

(72) Inventors: Sang Gun Na, Seoul (KR); Hyun Sik Kim, Gimpo (KR); Jun Woo Yoo, Seoul (KR); Yeong Hyeok Kim, Seoul (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 371 days.

(21) Appl. No.: 18/149,732

(22) Filed: Jan. 4, 2023

(65) Prior Publication Data
US 2023/0212032 A1    Jul. 6, 2023

(30) Foreign Application Priority Data
Jan. 6, 2022   (KR) .................. 10-2022-0002173

(51) Int. Cl.
*B01D 21/30*   (2006.01)
*B01D 29/60*   (2006.01)
*B01D 61/12*   (2006.01)
*B01D 61/22*   (2006.01)
*C02F 1/00*   (2023.01)
(Continued)

(52) U.S. Cl.
CPC .............. *C02F 1/008* (2013.01); *B01D 21/30* (2013.01); *B01D 29/60* (2013.01); *B01D 61/12* (2013.01);
(Continued)

(58) Field of Classification Search
CPC .. C02F 1/008; C02F 9/00; C02F 1/001; C02F 1/24; C02F 1/441; C02F 1/444;
(Continued)

(56) References Cited

U.S. PATENT DOCUMENTS 6,068,012 A * 5/2000 Beardwood ............ G05D 21/02
137/88
6,408,227 B1 * 6/2002 Singhvi ................ G05B 13/027
700/32
(Continued)

FOREIGN PATENT DOCUMENTS

JP         6422901 B1   11/2018
JP      2021159870 A   10/2021
(Continued)

OTHER PUBLICATIONS

KR OA dated May 20, 2024.
The KR NOA, dated Dec. 30, 2024.

*Primary Examiner* — Joseph W Drodge
(74) *Attorney, Agent, or Firm* — Harvest IP Law, LLP

(57) ABSTRACT

An apparatus for controlling output in a water treatment plant treating water includes: a chemical dosing management part configured to analyze real-time data to determine a control mode of chemical dosing optimization, and provide the determined control mode as a management command; a chemical dosing optimization part configured to analyze the real-time data to derive a control value such that the control value is to set a minimum of a chemical dosage to be dose in the water while a state of treated water of the water treatment plant is maintained in a normal range; and a chemical dosing output control part configured to provide the control value to a water treatment control device for controlling the water treatment plant, according to the control mode of the management command.

18 Claims, 9 Drawing Sheets

(51) Int. Cl.
*C02F 1/24* (2023.01)
*C02F 1/44* (2023.01)
*C02F 1/66* (2023.01)
*C02F 1/68* (2023.01)
*C02F 9/00* (2023.01)
*C02F 1/52* (2023.01)

(52) U.S. Cl.
CPC ............... *B01D 61/22* (2013.01); *C02F 9/00* (2013.01); *C02F 1/001* (2013.01); *C02F 1/24* (2013.01); *C02F 1/441* (2013.01); *C02F 1/444* (2013.01); *C02F 1/5209* (2013.01); *C02F 1/5245* (2013.01); *C02F 1/66* (2013.01); *C02F 1/68* (2013.01); *C02F 2209/006* (2013.01)

(58) Field of Classification Search
CPC ........ C02F 1/5209; C02F 1/5245; C02F 1/66; C02F 1/68; C02F 2209/006; C02F 1/5236; C02F 1/685; C02F 2209/001; C02F 2209/003; C02F 2209/008; C02F 2209/02; C02F 2209/03; C02F 2209/40; C02F 2209/42; C02F 1/686; C02F 1/687; C02F 2209/005; B01D 35/28; B01D 21/30; B01D 21/305; B01D 29/60; B01D 61/12; B01D 61/22; G05D 21/00; G05D 21/02

See application file for complete search history.

(56) References Cited

U.S. PATENT DOCUMENTS

| | | | |
|---|---|---|---|
| 6,535,795 B1 * | 3/2003 | Schroeder | G05B 13/029 210/85 |
| 6,845,336 B2 * | 1/2005 | Kodukula | G01N 33/18 702/50 |
| 8,489,240 B2 | 7/2013 | Wan | |
| 2002/0077777 A1 * | 6/2002 | Wolfe | G05B 23/0221 702/182 |
| 2008/0046127 A1 | 2/2008 | Piironen | |
| 2010/0204924 A1 * | 8/2010 | Wolfe | C02F 1/008 702/188 |
| 2010/0332149 A1 * | 12/2010 | Scholpp | C02F 1/008 702/188 |
| 2013/0193038 A1 * | 8/2013 | Robertson | C02F 3/302 210/85 |
| 2014/0277746 A1 * | 9/2014 | Konishi | C02F 1/008 700/265 |
| 2015/0259230 A1 * | 9/2015 | Li | C02F 1/688 210/85 |
| 2017/0297929 A1 * | 10/2017 | Whitaker | C02F 1/008 |
| 2021/0039976 A1 * | 2/2021 | Kiljunen | C02F 11/12 |
| 2022/0127172 A1 * | 4/2022 | Friesen | C02F 1/78 |

FOREIGN PATENT DOCUMENTS

| | | |
|---|---|---|
| KR | 05-169082 A | 7/1993 |
| KR | 10-0720139 B1 | 5/2007 |
| KR | 10-0808607 B1 | 2/2008 |
| KR | 10-0904050 B1 | 6/2009 |
| KR | 101113363 B1 | 3/2012 |
| KR | 10-2014-0053344 A | 5/2014 |
| KR | 10-1418738 B1 | 7/2014 |
| KR | 20160027815 A | 3/2016 |
| KR | 2017-140595 A | 8/2017 |
| KR | 101889510 B1 | 8/2018 |
| KR | 10-2020-0103838 A | 9/2020 |

* cited by examiner

APPARATUS AND METHOD FOR CONTROLLING OUTPUT FOR CHEMICAL DOSING OPTIMIZATION FOR WATER TREATMENT PLANT

CROSS REFERENCE TO RELATED APPLICATION

The present application claims priority to Korean Patent Application No. 10-2022-0002173, filed Jan. 6, 2022, the entire contents of which are incorporated herein for all purposes by this reference.

BACKGROUND OF THE INVENTION

1. Field of the Invention

The present disclosure relates to an output control technology. More particularly, the present disclosure relates to an apparatus and a method for controlling output for chemical dosing optimization for a water treatment plant.

2. Description of the Background Art

Pre-treatment performed by a seawater desalination plant uses chemicals, such as a pH control agent and a coagulant, at a stage before a dissolved air flotation (DAF) process in order to remove suspended materials such as solids. Existing methods rely on sampling experiments and operators' knowledge in order to dose appropriate chemicals, but it is difficult to perform control by applying real-time state changes in feed water, such as seawater, wastewater, etc.

The foregoing is intended merely to aid in the understanding of the background of the present disclosure, and is not intended to mean that the present disclosure falls within the purview of the related art that is already known to those skilled in the art.

SUMMARY OF THE INVENTION

The present disclosure is directed to providing an apparatus and a method for controlling output for chemical dosing optimization for a water treatment plant.

According to an exemplary embodiment of the present disclosure, there is provided an apparatus for controlling output in a water treatment plant treating water, the apparatus including: a chemical dosing management part configured to analyze real-time data to determine a control mode of chemical dosing optimization, and provide the determined control mode as a management command; a chemical dosing optimization part configured to analyze the real-time data to derive a control value such that the control value is to set a minimum of a chemical dosage to be dosed in the water while a state of treated water of a water treatment plant is maintained in a normal range; and a chemical dosing output control part configured to provide the control value to a water treatment control device for controlling the water treatment plant, according to the control mode of the management command.

The chemical dosing output control part may include: a control value correction part configured to correct the control value; a control mode management part configured to reset the control mode; and an output processing part configured to provide the control value to the water treatment control device according to the reset control mode.

The output processing part may be configured to convert the control value according to a control period of the water treatment control device and a control range in each control period, and provide the control value resulting from conversion to the water treatment control device.

The control mode management part may be configured to reset the control mode according to a previous control mode and whether the control value is normally updated, in a guide mode as the control mode of the management command.

The control mode management part may be configured to compare the real-time data of a previous control period with the real-time data of a current control period according to a predetermined control period, and reset the control mode to a hold mode in response to occurrence of a difference of a preset threshold or greater.

The output processing part may be configured, when the control mode is an auto mode, to apply the control value automatically to the water treatment control device.

The output processing part may be configured, when the control mode is a guide mode, to provide the control value to the water treatment control device, the control value being provided in a readable state so that the water treatment control device determines whether to apply the control value.

The output processing part may be configured, when the control mode is a hold mode, to convert the control value according to a control period of the water treatment control device and a control range in each control period, but do not provide the control value resulting from conversion to the water treatment control device.

The control value correction part may be configured to, in response to receiving a correction bias value from a post-process protection part, correct the control value according to the correction bias value, the correction bias value being for preventing damage to a late-stage process and being obtained by analyzing postprocess data including operating data and state data of a process resulting from the late-stage process.

According to an exemplary embodiment of the present disclosure, there is provided an apparatus for controlling output in a water treatment plant treating water, the apparatus including: a chemical dosing optimization part configured to derive a control value such that the control value is to set dosing a minimum of a chemical dosage to be dosed in the water while a state of treated water of the water treatment plant is maintained in a normal range; and a chemical dosing output control part configured to provide the control value to a water treatment control device for controlling the water treatment plant, according to a control mode.

The chemical dosing output control part may include an output processing part that is configured to convert the control value according to a control period of the water treatment control device and a control range in each control period, and provide the control value resulting from conversion to the water treatment control device.

The chemical dosing output control part may include a control mode management part that is configured to reset the control mode according to a previous control mode and whether the control value is normally updated.

The chemical dosing output control part may include a control mode management part that is configured to compare real-time data of a previous control period with real-time data of a current control period according to a predetermined control period, and reset the control mode to a hold mode in response to occurrence of a difference of a preset threshold or greater.

The chemical dosing output control part may include an output processing part that is configured, when the control mode is in a guide mode, to provide the control value to the water treatment control device, the control value being provided in a readable state so that the water treatment control device determines whether to apply the control value.

According to an exemplary embodiment of the present disclosure, there is provided a method for controlling output in a water treatment plant treating water, the method including: analyzing, by a chemical dosing management part, real-time data to determine a control mode of chemical dosing optimization and providing the determined control mode as a management command; analyzing, by a chemical dosing optimization part, the real-time data to derive a control value such that the control value is to set a minimum of a chemical dosage to be does in the water while a state of treated water of the water treatment plant is maintained in a normal range; and providing, by a chemical dosing output control part, the control value to a water treatment control device for controlling the water treatment plant, according to the control mode of the management command.

The providing of the control value to the water treatment control device may include: correcting the control value by a control value correction part; resetting the control mode by a control mode management part; and providing, by an output processing part, the control value to the water treatment control device according to the reset control mode.

In the providing of the control value to the water treatment control device, the output processing part may convert the control value according to a control period of the water treatment control device and a control range in each control period, and may provide the control value resulting from conversion to the water treatment control device.

In the resetting of the control mode, the control mode management part may reset the control mode according to a previous control mode and whether the control value is normally updated, in a guide mode as the control mode of the management command.

In the resetting of the control mode, the control mode management part may compare the real-time data of a previous control period with the real-time data of a current control period according to a predetermined control period, and may reset the control mode to a hold mode in response to occurrence of a difference of a preset threshold or greater.

In the providing of the control value to the water treatment control device, in an auto mode as the control mode, the output processing part may apply the control value automatically to the water treatment control device.

In the providing of the control value to the water treatment control device, in a guide mode as the control mode, the output processing part may provide the control value to the water treatment control device, the control value being provided in a readable state so that the water treatment control device determines whether to apply the control value.

In the providing of the control value to the water treatment control device, in a hold mode as the control mode, the output processing part may convert the control value according to a control period of the water treatment control device and a control range in each control period, but may not provide the control value resulting from conversion to the water treatment control device.

In the correcting of the control value, a postprocess protection part may analyze postprocess data including operating data and state data of a process resulting from a late-stage process and may derive a correction bias value for preventing damage to the late-stage process, and then the control value correction part may correct the control value according to the correction bias value.

According to the present disclosure, real-time data is analyzed to examine whether a water treatment control device is abnormal, and an abnormal state of a chemical dosing optimization apparatus itself is examined, and a control value for chemical dosing optimization is provided, thereby performing chemical dosing optimization stably.

DETAILED DESCRIPTION OF THE INVENTION

Figure 1:
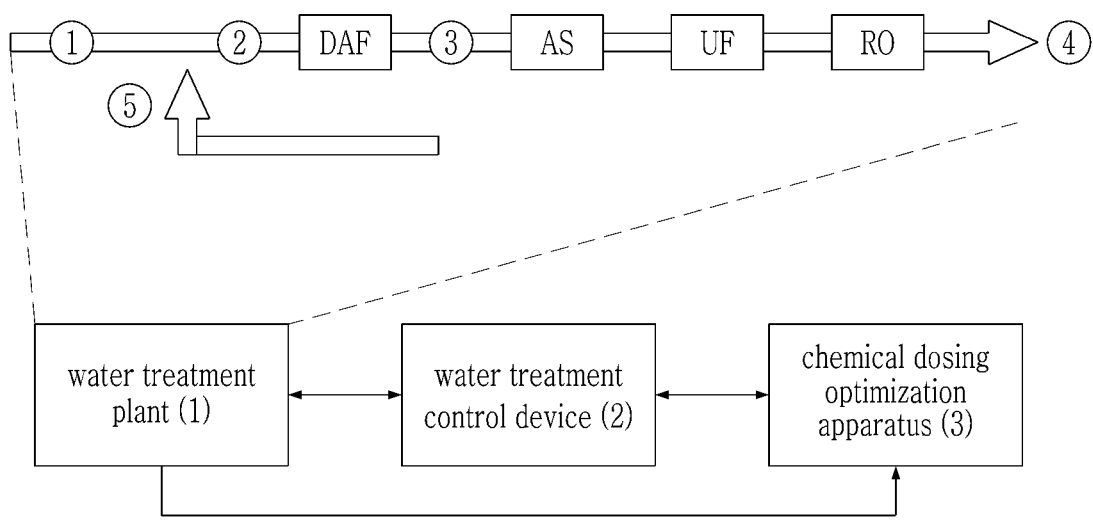
FIG. 1 is a diagram illustrating a configuration of a water treatment system according to an embodiment of the present disclosure.

The present disclosure may be modified in various ways and has various embodiments, so particular embodiments will be illustrated and described in detail. However, the present disclosure is not limited thereto, and the exemplary embodiments can be construed as including all modifications, equivalents, or substitutes in a technical concept and a technical scope of the present disclosure.

Also, "a module," "a unit," or "a part" in the disclosure performs at least one function or operation, and these elements may be implemented as hardware, such as a processor or integrated circuit, software that is executed by a processor, or a combination thereof. Further, a plurality of "modules," a plurality of "units," or a plurality of "parts" may be integrated into at least one module or chip and may be implemented as at least one processor except for "modules," "units" or "parts" that should be implemented in a specific hardware.

The terms used in the present disclosure are merely used to describe the particular embodiments, and are not intended to limit the present disclosure. As used herein, the singular forms "a", "an", and "the" are intended to include the plural forms as well, unless the context clearly indicates otherwise.

In the present disclosure, it is to be understood that terms such as "including", "having", "comprising" etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, exemplary embodiments of the present disclosure will be described in detail with reference to the drawings. Herein, it is noted that the same elements in the drawings are denoted by the same reference numerals. In addition, well-known functions and constructions that may obscure the gist of the present disclosure will not be described. For the same reason, some elements are exaggerated or omitted, or schematically shown in the drawings.

First, a water treatment system according to an embodiment of the present disclosure will be described. FIG. 1 is a diagram illustrating a configuration of a water treatment system according to an embodiment of the present disclosure. Referring to FIG. 1, the water treatment system according to an embodiment of the present disclosure includes a water treatment plant 1, a water treatment control device 2, and a chemical dosing optimization apparatus 3.

The water treatment plant 1 is for water treatment of treating feed water ① flowing into the water treatment plant 1 to suit an objective, and of discharging treated water ④. Examples of the water treatment include water treatment for a particular use, wastewater treatment, seawater desalination treatment, etc. The water treatment plant 1, according to an embodiment, includes a dissolved air flotation (DAF) device, an automatic strainer (AS), an ultrafiltration (UF) device, and a reverse osmosis (RO) device.

The DAF device treats the feed water ② according to dissolved air flotation. The automatic strainer (AS) removes solids remaining in the feed water ③ treated by the DAF device so as to prevent foreign substances from flowing in. The UF device includes a plurality of ultrafiltration units each having an ultrafiltration membrane. The UF device performs an ultrafiltration process in which the ultrafiltration membranes of the plurality of ultrafiltration units are used to filter out impurities remaining in the feed water ③. The UF device may pass treated water through the ultrafiltration membranes of the plurality of ultrafiltration units so as to filter out impurities remaining in the treated water. The RO device includes a plurality of trains each having a reverse osmosis membrane. The RO device performs a reverse osmosis process in which the reverse osmosis membranes of the plurality of trains are used to filter out impurities remaining in the feed water ③. The RO device passes the treated water through the reverse osmosis membranes of the plurality of trains to filter out impurities remaining in the feed water ③ according to a reverse osmosis principle, and discharges the treated water ④.

The water treatment control device 2 is basically a device for controlling the water treatment plant 1. In particular, chemicals are fed ⑤ in an early-stage process of the water treatment plant 1, and the water treatment control device 2 may control the chemical dosage. More specifically, in the early-stage process of the water treatment plant 1, chemicals, for example, an ion concentration (pH) control agent (e.g., H2SO4) and a coagulant (e.g., FeCl3) are fed. The water treatment control device 2 may control the dosing and the dosage of the chemicals.

The chemical dosing optimization apparatus 3 is for chemical dosing optimization. As described above, the water treatment control device 2 controls chemical dosing and the dosage for the water treatment plant 1. Herein, chemical dosing optimization is required so that the state of the treated water by water treatment is maintained in a normal range and a minimum of the chemical dosage is used in the feed water as necessary. However, the chemical dosage affects the differential pressure (DP) of the automatic strainer (AS), the UF device, and the RO device performing a late-stage process, so chemical dosing optimization is performed considering the differential pressure. The chemical dosing optimization apparatus 3 is for performing such chemical dosing optimization by controlling the water treatment control device 2 or giving guidance thereto. The chemical dosing optimization apparatus 3 may perform the chemical dosing optimization by providing guidance information to the water treatment control device 2.

Figure 2:
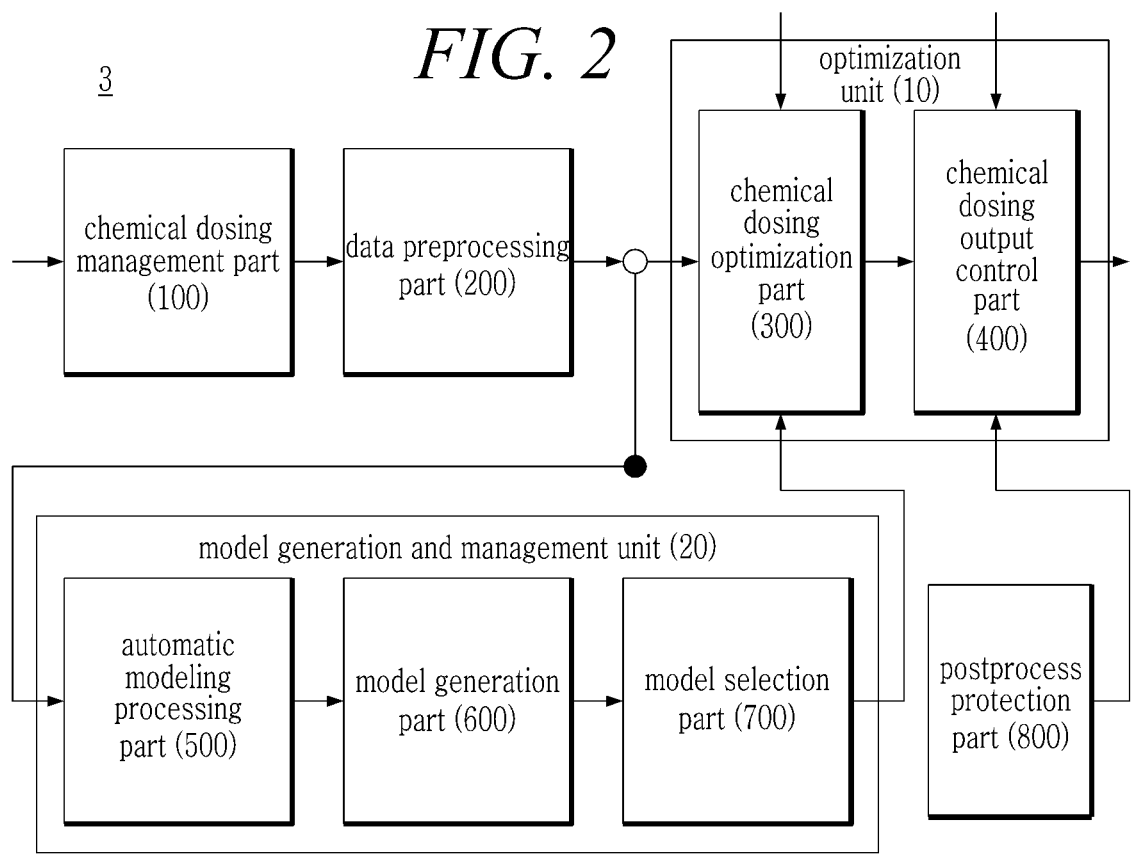
FIG. 2 is a block diagram illustrating a configuration of a chemical dosing optimization apparatus according to an embodiment of the present disclosure.

Next, a configuration of the chemical dosing optimization apparatus 3 according to an embodiment of the present disclosure will be described. FIG. 2 is a block diagram illustrating the configuration of the chemical dosing optimization apparatus according to an embodiment of the present disclosure. Referring to FIG. 2, the chemical dosing optimization apparatus 3 according to the embodiment of the present disclosure may include a chemical dosing management part 100 (performing DAF chemical dosing management), a data preprocessing part 200 (performing data preprocessing), an optimization unit 10 (performing chemical dosing optimization), a model generation and management unit 20 (performing DAF model generation and management), and a postprocess protection part 800 (postprocess protection logic). Furthermore, the optimization unit 10 may include a chemical dosing optimization part 300 (performing chemical dosing optimization algorithm) and a chemical dosing output control part 400 (which may be alternatively referred to as chemical dosing output controller). Furthermore, the model generation and management unit 20 may include an automatic modeling processing part 500 (which may be alternatively referred to as auto modeling processor for DAF model), a model generation part 600 (which may be alternatively referred to as DAF model candidate generator), and a model selection part 700 (which may be alternatively referred to as DAF model selection & management processor).

The chemical dosing management part 100 is for managing a chemical dosing optimization process. The chemical dosing management part 100 receives real-time data including operating data and state data from the water treatment plant 1 or the water treatment control device 2 or both, and analyzes the real-time data to determine whether to perform the chemical dosing optimization process. The real-time data means the operating data and the state data measured or derived in real time. In an embodiment of the present disclosure, the operating data may refer to and may include any one of all types of data including values, specifically, a set value (SV or target value (set point (SP))), a measured value (process variable (PV) or current value (CV)), and a manipulation value (manipulate variable (MV)), wherein the values are input to control processes or measured for the processes performed by the DAF device, the automatic strainer (AS), the UF device, and the RO device. Herein, the set value (SV or SP) means a value for setting a control target of an object to be controlled. The measured value (PV or CV) means a sensed value obtained by measuring the object to be controlled. The manipulation value (MV) means a control value for manipulation so that the object to be controlled reaches the set value from the measured value. Examples of the set value and the measured value include flow rate, pressure, water level, temperature, etc. Examples of the manipulation value include an opening ratio, the RPM speed of a motor, voltage, current, etc. The operating data may be processed according to each objective and may be used for analysis. In an embodiment of the present disclosure, data derived or processed for analyzing the operating data is referred to as the state data. Examples of the state data include values obtained by processing, through a logic derived through operating knowledge, data resulting from measuring a differential pressure of input and output stages of the UF device and the RO device.

The data preprocessing part 200 receives raw data. Herein, the raw data includes the operating data and the state data received by the data preprocessing part 200 from the water treatment plant 1 or the water treatment control device 2 or both. The raw data results from accumulation and storage of the operating data and the state data collected from the water treatment plant 1 and the water treatment control device 2. Accordingly, the raw data may include the real-time data including the operating data and the state data collected in real time. In addition, the raw data may include a plurality of types of data having different attributes. The raw data may be continuously received over time from the water treatment plant 1 or the water treatment control device 2. In particular, the raw data received by the data preprocessing part 200 may include input attribute data having input attributes and output attribute data having output attributes. The input attributes and the output attributes may be input attributes and output attributes of the water treatment plant 1.

The input attribute data may include the operating data and the state data related to the feed water flowing into the water treatment plant 1, in particular, the DAF device. Examples of the input attribute data may include the flow rate of the feed water, temperature, conductivity, acidity (or hydrogen ion concentration), turbidity, the throughput for the feed water (per unit time), the chemical dosage for the feed water, the chemical dosing concentration, etc. The output attribute data may include the operating data and the state data related to the treated water subjected to water treatment by the DAF device. Examples of the output attribute data may include acidity (or hydrogen ion concentration, pH) or a variation in acidity of the treated water, turbidity or a variation in turbidity, residual iron, etc. in the treated water.

According to an embodiment, when the raw data is collected, the data preprocessing part 200 preprocesses the raw data to generate training data. The training data may include data for training and data for verification divided according to use. In addition, the training data may include input data and output data divided according to attributes. The training data is provided to the model generation and management unit 20. In addition, the data preprocessing part 200 may preprocess the real-time data and may provide the preprocessed real-time data to the optimization unit 10. The data preprocessing part 200 may use tags indicating data attributes to perform preprocessing by analyzing the raw data including the real-time data. This preprocessing is to perform signal processing, normal data processing (based on knowledge/data), and outlier removal to remove noise, or to remove noise in data, or to remove data that may adversely affect generating a DAF model or designing a controller.

The optimization unit 10 analyzes the real-time data to derive a control value for optimizing the chemical dosage. The optimization unit 10 includes the chemical dosing optimization part 300 and the chemical dosing output control part 400 as described above.

According to an embodiment, the chemical dosing optimization part 300 may analyze current data, and uses an analysis result of the current data to select an optimum controller from among a plurality of controllers previously created, and searches for an optimal chemical dosing control value. To search for the optimal chemical dosing control value, optimization design information may be used. The optimization design information may include an objective function, a constraint, a moderator variable, a searching range, etc. Herein, using at least one water treatment model, the chemical dosing optimization part 300 may analyze the real-time data to derive a prediction value for predicting the state (for example, turbidity, pH, etc.) of the treated water of the water treatment plant 1. In addition, using at least one controller, the chemical dosing optimization part 300 may derive a control value based on the prediction value, such that the control value is to set a minimum of a chemical dosage to be dosed in the feed water, required for maintaining the state of the treated water of the water treatment plant 1 in the normal range. In other words, while the state of the treated water of the water treatment plant 1 is changed by an amount of chemical dosage used and the chemical dosage is changed by the control value, a control value may be derived by the chemical dosing optimization part 300 such that the control value is to set the lowest amount of the chemical dosage that makes the state of the treated water of the water plant 1 be in the normal range. The normal range of the treated water may be a predetermined value range of any indication of acidity (pH), turbidity, residual iron, dissolved oxygen, nitrogen, mercury, phosphorus, carbon dioxide, or hydrogen ion concentration of/in the treated water or any combination thereof.

The chemical dosing output control part 400 is basically for finally determining whether to provide or not provide the control value derived by the chemical dosing optimization part 300, according to a management command or a current state or both. The management command or the current state may be provided by the chemical dosing management part 100. The control value provided from the chemical dosing optimization part 300 to the chemical dosing output control part 400 is derived using the real-time data by the chemical dosing optimization part 300. However, there may be a case when the control value is data of the past time, e.g., one minute or five minutes, ago than the present time point of processing by the chemical dosing output control party 40. In other words, there may be a case when it takes time for the chemical dosing optimization part 300 to search for the control value. Accordingly, according to an embodiment, the chemical dosing output control part 400 may compare the operating data and the state data that are the basis of calculation of the control value with the current operating data and the current state data. According to the comparison, when the differences are equal to or greater than reference values, the chemical dosing output control part 400 may correct the control value, or hold or stop the output of the control value. The chemical dosing output control part 400 may provide the control value according to the management command of the chemical dosing management part 100 such that the water treatment control device 2 applies the control value automatically, or may provide the control value in the form of guidance such that the water treatment control device 2 determines whether to apply the control value.

In addition, according to an embodiment, the chemical dosing output control part 400 may correct the control value by using a correction bias value derived by the postprocess protection part 800 according to a postprocess protection logic. In particular, the chemical dosing output control part 400 may convert the control value according to a control period and a control range of the water treatment control device 2 such that the water treatment control device 2 operates stably, and the chemical dosing output control part 400 provides the control value resulting from conversion to the water treatment control device 2. According to an embodiment of the present disclosure, the chemical dosing output control part 400 may convert the control value according to a range applicable to the water treatment control device 2. That is, the chemical dosing output control part 400 my convert the control value according to the control period and the control range of the water treatment control device 2 compared to a period of derivation of the control value by the chemical dosing optimization part 300. For example, assuming that the time period, that is, the control period of derivation of the control value, for the chemical dosing optimization part 300 to search for an optimal control value is one minute and the control period of the water treatment control device 2 is 10 seconds and the control range is ±4, the control value of which the period of derivation is one minute is converted according to the control period, a 10-second interval, of the water treatment control device 2 and the control range of ±4, thereby calculating the application control values. Specifically, when the control value is for increasing by 20 from an existing value, the control value is converted into values, +4, +8, +12, +16, +20, and +20, increased by 4 every 10 seconds.

The model generation and management unit 20 is for automatically generating at least one water treatment model through training. The water treatment model is an algorithm including at least one artificial neural network, and simulates the water treatment plant 1 that generates treated water through water treatment (for example, DAF) of feed water. According to an embodiment, the water treatment model may receive various types of information indicative of the state of the feed water, and calculates a prediction value for predicting the state of the treated water by performing an operation on the state of the feed water as trained. Herein, examples of the state of the feed water may include the flow rate of the feed water, temperature, conductivity, acidity (or hydrogen ion concentration), turbidity, the throughput for the feed water (per unit time), the chemical dosage for the feed water, the chemical dosing concentration, etc. In addition, examples of the state of the treated water may include acidity or a variation in acidity of the treated water, turbidity or a variation in turbidity, residual iron, etc.

According to an embodiment, the model generation and management unit 20 may include the automatic modeling processing part 500, the model generation part 600, and the model selection part 700.

According to an embodiment, the automatic modeling processing part 500 may design a water treatment model to be newly generated and generates model design information. The automatic modeling processing part 500 designs a form, a structure, input and output, and a variable of the water treatment model. According to an embodiment, the automatic modeling processing part 500 may receive and determine model design information, such as a form, a structure, input and output, and a variable, of a water treatment model. According to another embodiment, the automatic modeling processing part 500 may extract model design information from any one of a plurality of pre-stored seed models, and may design a water treatment model according to the extracted model design information. The seed models are models generated by experts among water treatment models. The automatic modeling processing part 500 extracts model design information including at least one selected from the group of a form, a structure, input and output, and a variable of a seed model, and applies the model design information to a water treatment model to be newly generated. The extracted model design information is applied to the water treatment model to be newly generated.

According to an embodiment, the model generation part 600 may receive the model design information from the automatic modeling processing part 500, and generates a water treatment model based on the model design information through training with the training data. That is, the model generation part 600 generates a plurality of water treatment models through training with the training data including the data for training and the data for verification, wherein the water treatment models simulate the water treatment plant and predict the states of the treated water according to the states of the feed water for the water treatment plant. The training data includes the data for training and the data for verification and includes the input data and the output data corresponding to the input data. For example, examples of the input data may include the flow rate of the feed water, temperature, conductivity, acidity (or hydrogen ion concentration), turbidity, the throughput for the feed water (per unit time), the injection dosing concentration for the feed water, etc. In addition, examples of the output data may include acidity or a variation in acidity of the treated water, turbidity or a variation in turbidity, etc. Herein, in training, the output data may be used as a target value corresponding to the input data.

According to an embodiment, the model selection part 700 may select the optimal water treatment model by comparing a water treatment model generated by the model generation part 600 with pre-stored water treatment models for evaluation. To this end, evaluation data indicative of the water treatment plant 1 at the time point of evaluation may be used to evaluate the plurality of water treatment models. Similarly to the training data and the verification data, the evaluation data may include input data and output data corresponding to the input data. That is, the model selection part 700 generates the evaluation data based on data collected from the water treatment plant 1 at the time point of evaluation, and performs evaluation with the generated evaluation data. That is, the model selection part 700 may use the evaluation data collected from the water treatment plant 1 at the time point of evaluation to evaluate the plurality of water treatment models. As an evaluation result, the model selection part 700 may select, among the plurality of water treatment models, the water treatment model having the highest similarity to the water treatment plant 1 at the time point of evaluation. Next, the model selection part 700 may provide the selected water treatment model to the chemical dosing optimization part 300. In addition, each time evaluation ends, the model selection part 700 may arrange the water treatment models in order of generation. When the storage capacity of a storage space in which the water treatment models are stored is insufficient, the model selection part 700 may delete, among the unselected water treatment models, the water treatment models sequentially in chronological order of generation.

According to an embodiment, the postprocess protection part 800 may receive postprocess data including the operating data and the state data of the late-stage process, specifically, the process performed by the automatic strainer (AS), the UF device, and the RO device, of the water treatment plant 1 and may analyze the received postprocess data to derive a correction bias value for protecting the postprocess according to a postprocess protection logic for preventing damage to the late-stage process, for example, a situation in which fouling occurs. Herein, fouling means a phenomenon in which contaminants in the feed water clog a membrane. The correction bias value may be provided to the chemical dosing output control part 400.

Figure 3:
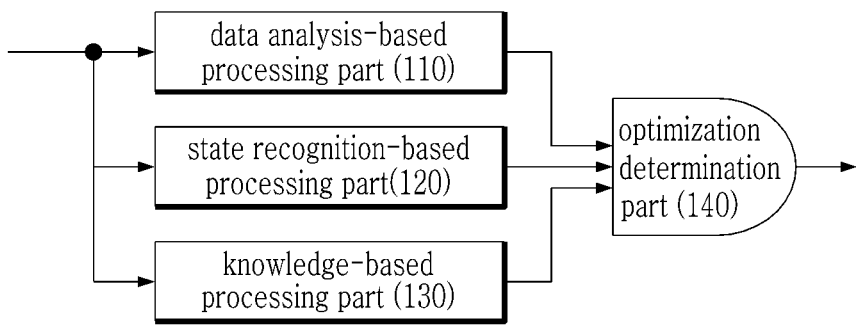
FIG. 3 is a block diagram illustrating a configuration of a device for managing chemical dosing optimization according to an embodiment of the present disclosure.

Next, a device for managing chemical dosing optimization according to an embodiment of the present disclosure will be described. FIG. 3 is a block diagram illustrating a configuration of the device for managing chemical dosing optimization according to an embodiment of the present disclosure.

Referring to FIG. 3, the chemical dosing management part 100 according to an embodiment of the present disclosure may include a data analysis-based processing part 110, a state recognition-based processing part 120, a knowledge-based processing part 130, and an optimization determination part 140.

The chemical dosing management part 100 may receive the real-time data including the operating data and the state data, and determines whether to perform the chemical dosing optimization process for optimizing the chemical dosage injected in the early-stage process of the water treatment plant 1, and determines the performance aspect of the chemical dosing optimization process. Herein, optimization is to ensure an optimized state that is a state in which the chemical dosage is minimized while the state of the treated water of the water treatment plant 1 is maintained in the normal range. To this end, the real-time data is input to the data analysis-based processing part 110, the state recognition-based processing part 120, and the knowledge-based processing part 130. Each of the data analysis-based processing part 110, the state recognition-based processing part 120, and the knowledge-based processing part 130 determines a condition for determining whether to perform the chemical dosing optimization process. In addition, the optimization determination part 140 combines the conditions to determine whether to perform the chemical dosing optimization process and determine the performance aspect thereof. A detailed description of this is as follows.

The data analysis-based processing part 110 may analyze the operating data of the water treatment plant 1 through a learning model to determine whether the water treatment plant is in the optimized state, thereby determining a first condition for determining the start of the chemical dosing optimization process. Herein, the learning model may be a pattern recognition model or a machine learning model that determines whether the water treatment plant is in the optimized state or not. Accordingly, the learning model analyzes the operating data to determine whether the water treatment plant is in the optimized state. When the water treatment plant is not in the optimized state, it is determined that the first condition is satisfied.

The state recognition-based processing part 120 may analyze the state data of the water treatment plant 1 to detect an abnormal state of the water treatment plant, thereby determining a second condition for determining whether to perform the chemical dosing optimization process. Herein, examples of the abnormal state include an inflow of algae, an overflow inflow of throughput or more into the water treatment plant, a system abnormality in the water treatment plant 1, a sensor abnormality, etc. The state recognition-based processing part 120 analyzes the state data, and determines that the second condition is satisfied when the abnormal state is detected. According to an embodiment, by analyzing the state data of the water treatment plant 1, the water treatment plant 1 may be detected as being in an abnormal state if any indication of acidity (pH), turbidity, residual iron, dissolved oxygen, nitrogen, mercury, phosphorus, carbon dioxide, or hydrogen ion concentration of/in the treated water or any combination thereof is not within a predetermined value range.

The knowledge-based processing part 130 may use pre-stored knowledge-based data to analyze the operating data and the state data of the real-time data of the late-stage process, specifically, the process performed by the automatic strainer (AS), the UF device, and the RO device, of the water treatment plant 1 and to detect whether the operating data and the state data correspond to the pre-stored knowledge-based data, thereby determining a third condition for determining whether to perform the chemical dosing optimization process. That is, the knowledge-based data resulting from storing data representing a situation in which the chemical dosing optimization process is required according to existing empirical rules, and the knowledge-based processing part 130 determines that the third condition is satisfied when the operating data and the state data correspond to the knowledge-based data.

Depending on whether the first, the second, and the third condition are satisfied, the optimization determination part 140 may determine whether to perform the chemical dosing optimization process and determines the performance aspect thereof. That is, when all the first condition, the second condition, and the third condition are satisfied, the optimization determination part 140 performs control such that the optimization unit 10 derives a control value for entering the optimized state by performing the chemical dosing optimization process and provides the derived control value to the water treatment control device. According to an embodiment, when the first condition is satisfied and the second condition or the third condition or both are not satisfied, the optimization determination part 140 performs control such that the optimization unit 10 provides the control value in the form of guidance. In this case, performing the chemical dosing optimization process has the possibility of worsening the state of the water treatment plant 1 or the water treatment control device 2, so the control value is provided in the form of guidance and the chemical dosing optimization process is not forced. The control value provided in the form of guidance is provided or displayed through an operating screen so that an operator of the plant can read the control value. According to an embodiment, when the first condition is not satisfied, the optimization determination part 140 performs control such that the chemical dosing optimization process is not performed even when the second condition and the third condition are satisfied. In this case, performing the chemical dosing optimization process may worsen the state of the water treatment plant 1 or the water treatment control device 2 further, so the chemical dosing optimization process is not performed.

Figure 4:
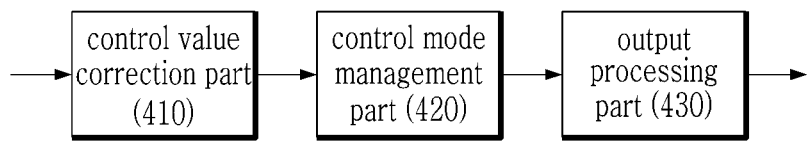
FIG. 4 is a diagram illustrating a configuration of a device for controlling output for chemical dosing optimization for a water treatment plant according to an embodiment of the present disclosure.

Next, a device for controlling output for chemical dosing optimization for a water treatment plant according to an embodiment of the present disclosure will be described. FIG. 4 is a diagram illustrating a configuration of the device for controlling output for chemical dosing optimization for a water treatment plant according to an embodiment of the present disclosure.

Referring to FIG. 4, the chemical dosing output control part 400 includes a control value correction part 410, a control mode management part 420, and an output processing part 430.

According to an embodiment, the control value correction part 410 may use a correction bias value received from the postprocess protection part 800 to correct a control value received from the chemical dosing optimization part 300 according to a predetermined control period (e.g., one minute).

Through at least one water treatment model, the chemical dosing optimization part 300 analyzes the real-time data received for a control period (e.g., one minute) to derive a prediction value for predicting the state (specifically, the state in ③ of FIG. 1) of the treated water of the water treatment plant 1. Through a controller, the chemical dosing optimization part 300 derives a control value based on the prediction value, wherein the control value is for dosing a minimum of a chemical dosage while the state of the treated water of the water treatment plant is maintained in the normal range. The chemical dosing optimization part 300 provides the derived control value to the chemical dosing output control part 400. In addition, the postprocess protection part 800 analyzes the postprocess data including the operating data and the state data of a process resulting from the late-stage process received for a control period (e.g., one minute) to derive a correction bias value for preventing damage to the late-stage process (specifically, damage occurring between ③ and ④ of FIG. 1), and provides the derived correction bias value to the chemical dosing output control part 400. Accordingly, the control value correction part 410 may use the correction bias value received from the postprocess protection part 800 to correct the control value. For example, when control values are target values of dosages of sulfuric acid and iron chloride, the control values may be corrected as in Equation 1 below.

$$\text{Sulfuric Acid Target} = \text{Sulfuric Acid Target} + \text{AFCS} \times \text{Sulfuric Acid Bias}$$

$$\text{Ferric Chloride Target} = \text{Ferric Chloride Target} + \text{AFCS} \times \text{Ferric Chloride Bias} \qquad \text{<Equation 1>}$$

Herein, Sulfuric Acid Target and Ferric Chloride Target are target values of dosages of sulfuric acid and iron chloride, the anti-fouling controller switch (AFCS) is 0 or 1, and Sulfuric Acid Bias and Ferric Chloride Bias are correction bias values of the dosages of sulfuric acid and iron chloride.

According to an embodiment, the control mode management part 420 is for resetting a control mode. The control mode may be one from among an auto mode, a guide mode, a hold mode, and a stop mode. The auto mode means that the output processing part 430 provides a control value to the water treatment control device 2 and the control value is automatically applied to the water treatment control device 2. In the auto mode, the water treatment control device 2 applies the control value automatically to control the water treatment plant 1. The guide mode is a mode in which the output processing part 430 provides a control value to the water treatment control device 2, but the control value is provided in a readable state so that the water treatment control device 2 determines whether to apply the control value. The hold mode is a mode in which the output processing part 430 converts a control value according to a control period of the water treatment control device and a control range in each control period, but the control value resulting from conversion is not provided to the water treatment control device. In the stop mode, the control mode management part 420 does not provide the control value to the output processing part 430. Accordingly, the output processing part 430 cannot provide the control value to the water treatment control device 2 in the stop mode.

As described above with reference to FIG. 3, the chemical dosing management part 100 analyzes the real-time data to determine the control mode of chemical dosing optimization, and provides the determined control mode as the management command. Then, according to an embodiment, the control mode management part 420 may reset the control mode considering the control mode of the previous control period according to a predetermined control period (e.g., one minute) and determining whether the control value is normally updated for each period according to the predetermined control period (e.g., one minute). According to an embodiment, the input of the control value needs to be updated for each control period (continual input is required despite the same value). However, according to an embodiment, when the control period in which the control value is not input continues for a predetermined period or longer, it may be determined that an abnormal situation has occurred and the control mode may be switched to the hold mode or the stop mode considering the control mode of the previous control period.

In addition, the control mode management part 420 may compare the real-time data of the previous control period with that of the current control period according to a predetermined control period, and when there is a difference equal to or greater than a preset threshold, the control mode management part 420 may reset the control mode to the hold mode. The control value calculated by the chemical dosing optimization part 300 is derived using the real-time data of the previous control period according to a control period. However, when there is a great difference beyond a predetermined reference value between the real-time data of the current control period and the real-time data of the previous control period, it may be determined that the control value has no reliability and the control mode is switched to the hold mode.

The output processing part 430 may provide the control value to the water treatment control device 2 according to the control by the control mode management part 420, that is, the control mode may be reset by the control mode management part 420. In particular, when the output processing part 430 receives the control value for each control period from the control mode management part 420, the output processing part 430 converts the control value according to the control period of the water treatment control device 2 and the control range of the water treatment control device 2 in each control period, and may provide the control value resulting from conversion to the water treatment control device 2. If it is assumed, for example, that the control period of the chemical dosing optimization apparatus 3 is one minute and the control period of the water treatment control device 2 is 10 seconds and it is assumed that the control range in each control period of the water treatment control device 2 is ±4, then, the chemical dosing optimization part 300 calculates the control value at intervals of one minute, and the control value correction part 410 of the chemical dosing output control part 400 corrects the control value at intervals of one minute, and the control mode management part 420 provides the control value to the output processing part 430 at intervals of one minute. Herein, the provided control value is the target value, and it is assumed that the target value is +20. Then, the output processing part 430 changes the control value and provides the water treatment control device 2 with the control values of +4, +8, +12, +16, +20, and +20 at intervals of 10 seconds according to the control period and the control range of the water treatment control device 2.

Figure 5:
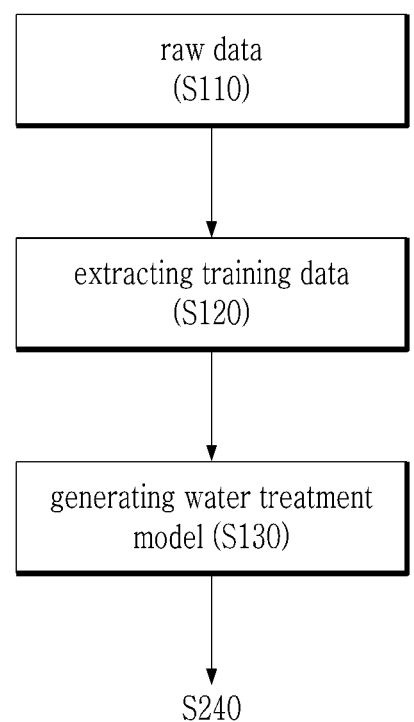
FIG. 5 is a flowchart illustrating a method of generating a water treatment model for chemical dosing optimization for a water treatment plant according to an embodiment of the present disclosure.

Next, a method of generating a water treatment model for chemical dosing optimization for a water treatment plant according to an embodiment of the present disclosure will be described. FIG. 5 is a flowchart illustrating the method of generating a water treatment model for chemical dosing optimization for a water treatment plant according to an embodiment of the present disclosure.

Referring to FIG. 5, a data preprocessing part 200 receives raw data in step S110. The raw data includes operating data and state data received from by the data preprocessing part 200 from a water treatment plant 1 or a water treatment control device 2 or both. The raw data results from accumulation and storage the operating data and the state data collected over time from the water treatment plant 1 and the water treatment control device 2. Accordingly, the raw data may include real-time data including the operating data and the state data collected in real time. In particular, the raw data may include a plurality of types of data having different attributes. The raw data may be continuously received over time from the water treatment plant 1 or the water treatment control device 2. In particular, the raw data may include input attribute data having input attributes and output attribute data having output attributes. The input attribute data may include the operating data and the state data related to the feed water flowing into the water treatment plant 1, in particular, the DAF device. Examples of the input attribute data may include the flow rate of the feed water, temperature, conductivity, acidity (or hydrogen ion concentration), turbidity, the throughput for the feed water (per unit time), the chemical dosage for the feed water, the chemical dosing concentration, etc. The output attribute data may include the operating data and the state data related to the treated water subjected to water treatment by the DAF device. Examples of the output attribute data may include acidity (or hydrogen ion concentration, pH) or a variation in acidity of the treated water, turbidity or a variation in turbidity, residual iron, etc.

When the raw data is collected, the data preprocessing part 200 preprocesses the raw data to generate training data in step S120. The training data may include data for training and data for verification divided according to use. In addition, the training data includes input data and output data divided according to attribute. The input data may be derived by preprocessing the input attribute data, and the output data may be derived by preprocessing the output attribute data. Examples of the input data may include the flow rate of the feed water, temperature, conductivity, acidity (or hydrogen ion concentration), turbidity, the throughput for the feed water (per unit time), the chemical dosage for the feed water, the chemical dosing concentration, etc. Examples of the output data may include acidity (or hydrogen ion concentration, pH) or a variation in acidity of the treated water, turbidity or a variation in turbidity, residual iron, etc.

Next, a model generation and management unit 20 including an automatic modeling processing part 500, a model generation part 600, and a model selection part 700 may receive the training data, and uses the training data to generate a water treatment model in step S130. In step S130, the automatic modeling processing part 500 may design the water treatment model. The designing of the water treatment model means specifying the form of the model, the number of submodels belonging to one model, input, output, and a variable. Then, the model generation part 600 may use the data for training of the training data to perform training on the designed water treatment model, thereby generating a water treatment model that simulates the water treatment plant 1 and predicts the state of the treated water according to the state of the feed water for the water treatment plant 1. Next, the model selection part 700 may use the data for verification of the training data to select, among a plurality of water treatment models, the water treatment model having the highest similarity to the water treatment plant 1. In this way, the selected water treatment model is provided to a chemical dosing optimization part 300 of an optimization unit 10.

Figure 6:
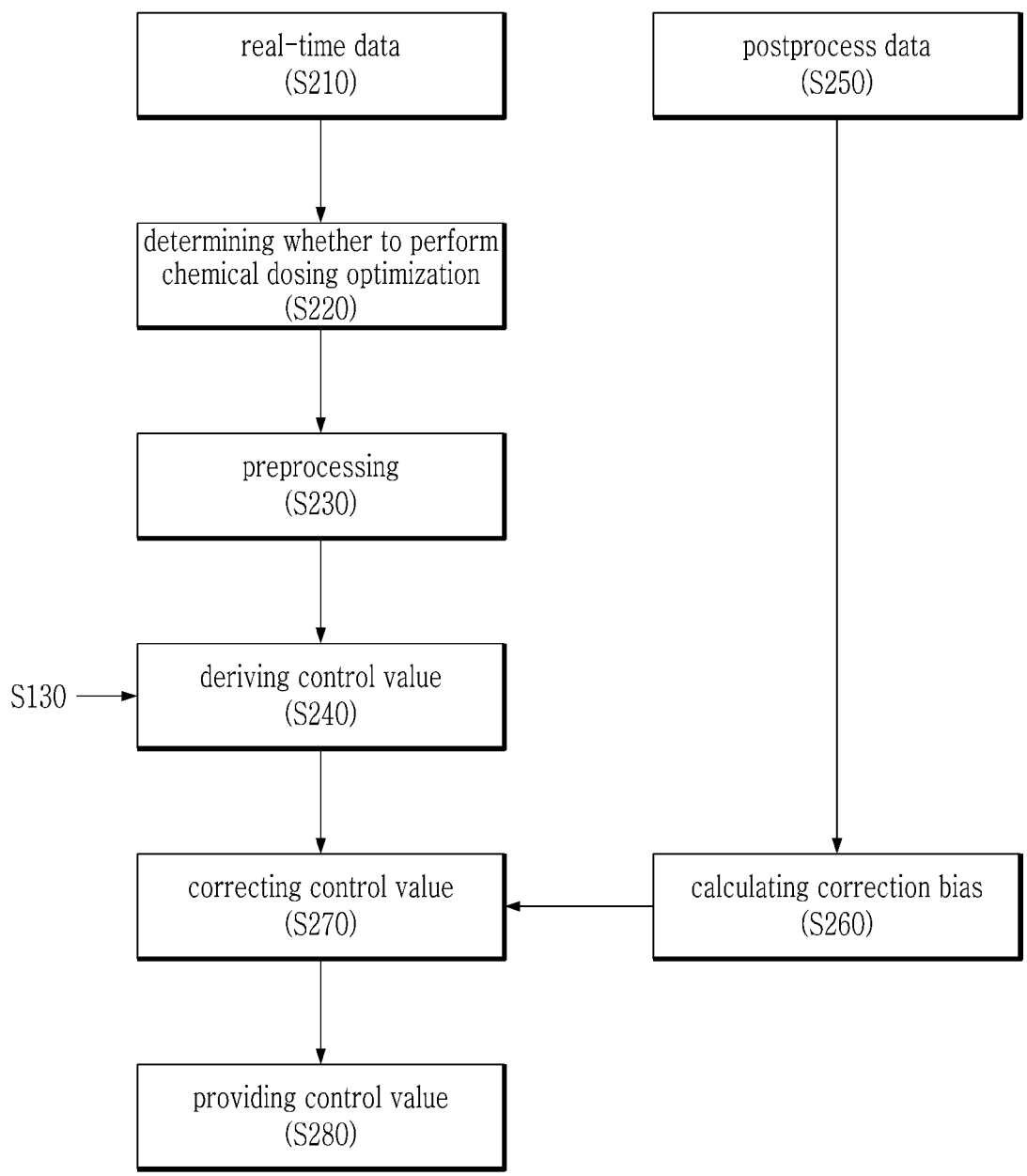
FIG. 6 is a flowchart illustrating a chemical dosing optimization method for a water treatment plant according to an embodiment of the present disclosure.

Next, a chemical dosing optimization method for a water treatment plant according to an embodiment of the present disclosure will be described. FIG. 6 is a flowchart illustrating the chemical dosing optimization method for a water treatment plant according to an embodiment of the present disclosure.

Referring to FIG. 6, a chemical dosing management part 100 may receive real-time data including operating data and state data in step S210. Then, the chemical dosing management part 100 may analyze the real-time data to determine whether a water treatment plant 1 is abnormal, and determines whether to perform chemical dosing optimization for optimizing a chemical dosage in step S220. When the water treatment plant 1 is normal and it is determined to perform chemical dosing optimization, a data preprocessing part 200 may preprocess the real-time data and provides the preprocessed real-time data to an optimization unit 10 including a chemical dosing optimization part 300 and a chemical dosing output control part 400 in step S230.

In the meantime, as described above with reference to FIG. 6, the optimization unit 10 may receive a water treatment model from a model generation and management unit 20. Accordingly, the chemical dosing optimization part 300 of the optimization unit 10 may analyze the real-time data through at least one water treatment model and at least one controller to derive a control value in step S240, wherein the control value is for dosing a minimum of a chemical dosage while the state of the treated water of the water treatment plant is maintained in a normal range. Herein, the controller may be a search algorithm. In addition, examples of the state of the treated water may include turbidity, acidity, residual iron, etc. In step S240, the at least one water treatment model may analyze the real-time data according to an input from the controller and derive a prediction value for predicting the state of the treated water of the water treatment plant, and the at least one controller may search for and derives a control value based on the prediction value of the water treatment model, wherein the control value is for dosing a minimum of a chemical dosage while the state of the treated water is maintained in the normal range. That is, a controller performs a simulation for predicting the state of the treated water of the water treatment plant through a water treatment model simulating the water treatment plant, thereby deriving an optimal control value.

In the meantime, the postprocess protection part 800 may receive postprocess data including the operating data and the state data of the late-stage process of the water treatment plant 1, specifically, the process performed by the automatic strainer (AS), the UF device, and the RO device, in step S250. The postprocess protection part 800 may analyze the received postprocess data to derive a correction bias value, and provides the correction bias value to the chemical dosing output control part 400 in step S260. The correction bias value is for protecting the postprocess according to a postprocess protection logic for preventing damage to the late-stage process, for example, a situation in which fouling occurs.

The chemical dosing output control part 400 may correct the control value according to the correction bias value and a control period and a control range of the water treatment control device 2 in step S270. Next, the chemical dosing output control part 400 may provide the control value derived by the chemical dosing optimization part 300 to the water treatment control device 2 according to a management command or a current state or both of the chemical dosing management part 100 in step S280. Herein, the chemical dosing output control part 400 may not provide the control value to the water treatment control device 2 according to the management command or the current state or both.

Figure 7:
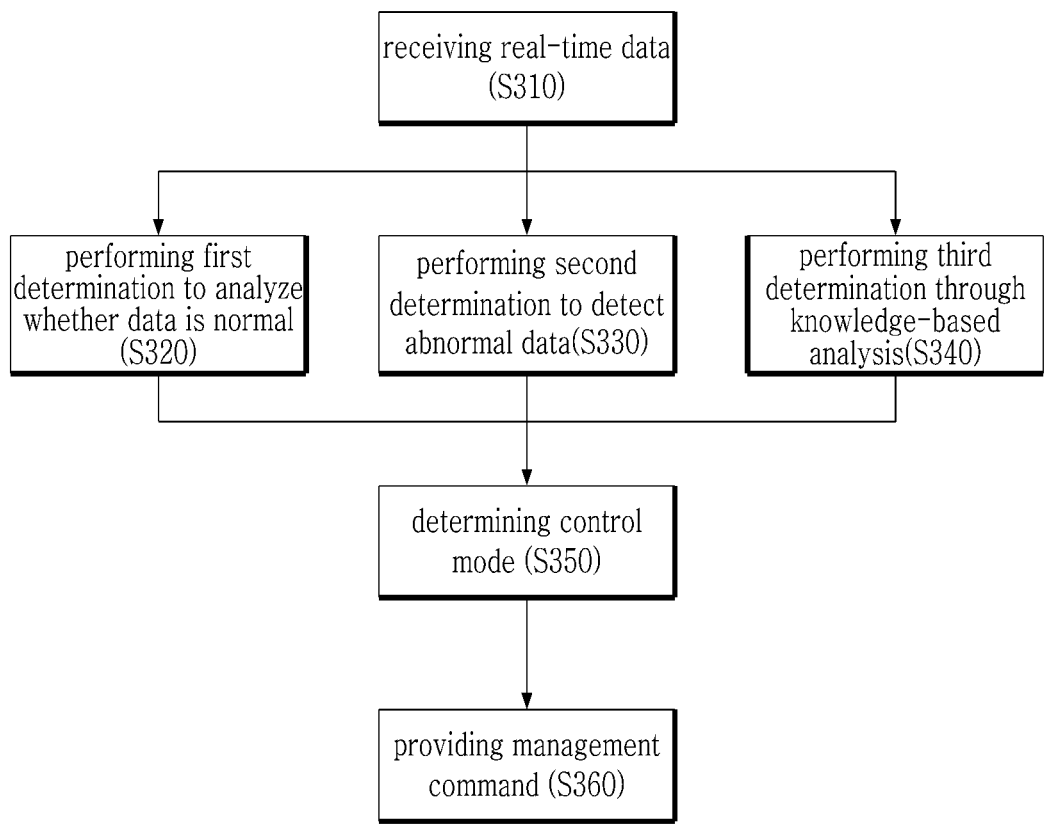
FIG. 7 is a flowchart illustrating a method for managing water treatment optimization according to an embodiment of the present disclosure.

Next, a method for managing water treatment optimization according to an embodiment of the present disclosure will be described. FIG. 7 is a flowchart illustrating the method for managing water treatment optimization according to an embodiment of the present disclosure.

Referring to FIG. 7, a chemical dosing management part 100 may receive real-time data including operating data and state data in step S310. The real-time data may be received from a water treatment plant 1 or a water treatment control device 2 or both.

Accordingly, the chemical dosing management part 100, which includes a data analysis-based processing part 110, a state recognition-based processing part 120, a knowledge-based processing part 130, and an optimization determination part 140, may analyze the real-time data to determine whether the water treatment plant 1 is in a normal state.

To this end, the data analysis-based processing part 110 may determine whether the real-time data is data in the normal state, by using a learning model or through a data pattern analysis, thereby providing a first determination result of determining whether the water treatment plant is in the normal state in step S320. Herein, the data analysis-based processing part 110 may use the learning model to classify the received real-time data as data in the normal state or data in an abnormal state. Alternatively, through the data pattern analysis, the data analysis-based processing part 110 may determine whether the received real-time data has a pattern in the normal state or the received real-time data does not have the pattern in the normal state.

In addition, the state recognition-based processing part 120 may provide a second determination result of determining whether the water treatment plant 1 is in the normal state in step S330. The second determination result may be made by the state recognition-based processing part 120 based on whether data indicative of the abnormal state of the water treatment plant 1 is detected from data indicative of the state of the water treatment plant 1 in the received real-time data. For example, the state recognition-based processing part 120 may detect the data indicative of the state of the water treatment plant 1 indicating an inflow of algae, an overflow of feed water, a system abnormality, a sensor abnormality, etc.

In addition, the knowledge-based processing part 130 may compare pre-stored knowledge-based data with postprocess data of the received real-time data, and thereby provide a third determination result of determining whether the water treatment plant is in the normal state in step S340. The third determination result may be made by the knowledge-based processing party 130 based on whether postprocess data corresponding to the knowledge-based data is present. Herein, the knowledge-based data refers to postprocess data indicating that the water treatment plant 1 is in the abnormal state according to, for example, existing empirical rules. In addition, the postprocess data may include the operating data and the state data of the late-stage process of the real-time data.

The optimization determination part 140 may determine a control mode of chemical dosing optimization based on the first, the second, and the third determination results in step S350. The chemical dosing optimization means applying a control value to dose the minimum amount of chemical dosage while the state of the treated water of the water treatment plant is maintained in a normal range. The control mode of the chemical dosing optimization means a way of applying the control value to the water treatment control device 2. Herein, the way of applying the control value may include an auto mode, a guide mode, and a stop mode. Herein, the auto mode is a mode in which a control value is automatically applied to the water treatment control device 2. The guide mode is a mode in which a control value is provided to the water treatment control device, wherein the water treatment control device 2 further determines whether to apply the control value. For example, whether to apply the control value may be determined in the water treatment control device 2. For another example, in the guide mode, the control value may be provided or displayed through an operating screen so that an operator of the water treatment control device 2 can read the control value. Accordingly, the operator of the water treatment control device 2 reads a control value, and the control value may be applied according to an input by the operator of the water treatment control device 2. The control value may be applied when it is determined that application is possible or required. The stop mode is a mode in which a control value is not provided to the water treatment control device 2.

The optimization determination part 140 may generate and provide a management command to an optimization unit 10 in step S360 so that chemical dosing optimization is performed according to the control mode. Then, the optimization unit 10 may generate a control value so that chemical dosing optimization is performed using the generated control value by referring to the control mode of chemical dosing optimization according to the management command.

Figure 8:
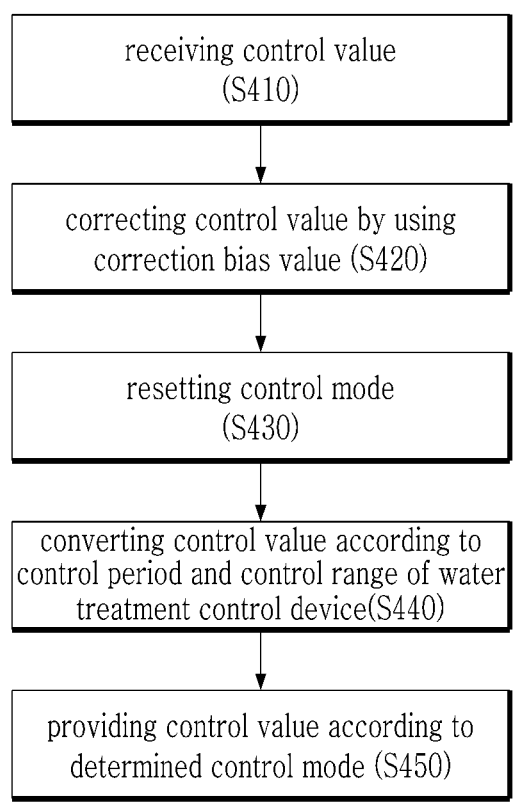
FIG. 8 is a flowchart illustrating a method for controlling output for chemical dosing optimization for a water treatment plant according to an embodiment of the present disclosure.

Next, a method for controlling output for chemical dosing optimization for a water treatment plant according to an embodiment of the present disclosure will be described. FIG. 8 is a flowchart illustrating the method for controlling output for chemical dosing optimization for a water treatment plant according to an embodiment of the present disclosure.

Referring to FIG. 8, a control value correction part 410 may receive a control value from a chemical dosing optimization part 300 according to a control period (for example, one minute) of a chemical dosing optimization apparatus 3 in step S410. Then, the control value correction part 410 may correct the received control value by using a correction bias value received from a postprocess protection part 800 in step S420. Using at least one water treatment model, the chemical dosing optimization part 300 may analyze the real-time data received for a control period (e.g., one minute) to derive a prediction value for predicting the state (specifically, the state in ③ of FIG. 1) of the treated water of the water treatment plant 1. Through a controller, the chemical dosing optimization part 300 may derive a control value based on the prediction value, wherein the control value is for dosing a minimum of a chemical dosage while the state of the treated water of the water treatment plant is maintained in the normal range. The chemical dosing optimization part 300 provides the derived control value to the chemical dosing output control part 400. In addition, the postprocess protection part 800 may analyze the postprocess data including the operating data and the state data of a process resulting from the late-stage process received for a control period (e.g., one minute) to derive a correction bias value for preventing damage to the late-stage process (specifically, damage occurring between ③ and ④ of FIG. 1). Then the postprocess protection part 800 may provide the derived correction bias value to the chemical dosing output control part 400. Accordingly, the control value correction part 410 may use the correction bias value to correct the control value. For example, when control values are target values of dosages of sulfuric acid and iron chloride, the control values may be corrected as in Equation 1 described above.

Next, the control mode management part 420 may reset a control mode in step S430. The chemical dosing management part 100 may analyze the real-time data to determine the control mode of chemical dosing optimization, and provide the determined control mode as a management command. Then, the control mode management part 420 may reset the control mode considering the control mode of the previous control period according to the control period (for example, one minute) of the chemical dosing optimization apparatus 3 and determining whether the control value is normally updated for each control period. The input of the control value needs to be updated for each control period (continual input is required despite the same value). However, when the control period in which the control value is not input continues for a predetermined period of time or longer, it may be determined that an abnormal situation has occurred and the control mode may be switched to a hold mode or a stop mode considering the control mode of the previous control period. In addition, the control mode management part 420 may compare the real-time data of the previous control period with that of the current control period according to a predetermined control period, and when there is a difference equal to or greater than a preset threshold, the control mode management part 420 may reset the control mode to the hold mode. The control value calculated by the chemical dosing optimization part 300 is derived using the real-time data received in the previous control period according to a control period. However, when there is a great difference between the real-time data of the current control period and the real-time data of the previous control period beyond a predetermined reference value, it may be determined that the control value has no reliability and the control mode may be switched to the hold mode.

Next, when an output processing part 430 receives the control value for each control period from the control mode management part 420, the output processing part 430 may convert the control value according to a control period of the water treatment control device 2 and a control range of the water treatment control device 2 in each control period in step S440. Assuming that the control period of the chemical dosing optimization apparatus 3 is one minute and the control period of the water treatment control device 2 is 10 seconds and that the control range in each control period of the water treatment control device 2 is ±4, then the chemical dosing optimization part 300 calculates the control value at intervals of one minute, and the control value correction part 410 of the chemical dosing output control part 400 corrects the control value at intervals of one minute, and the control mode management part 420 provides the control value to the output processing part 430 at intervals of one minute. Herein, assuming that the provided control value is the target value, and that the target value is +20, then the output processing part 430 changes the control value, so that the control value (target value) is converted into +4, +8, +12, +16, +20, and +20 at intervals of 10 seconds according to the control period and the control range of the water treatment control device 2.

Next, the output processing part 430 may provide the control value resulting from conversion to the water treatment control device 2 according to the control by the control mode management part 420, that is, the control mode reset by the control mode management part 420 in step S450. The control mode may include an auto mode, a guide mode, the hold mode, and the stop mode. The auto mode is a mode in which the output processing part 430 provides a control value to the water treatment control device 2 and the control value is automatically applied to the water treatment control device 2. In the auto mode, the water treatment control device 2 applies the control value automatically to control the water treatment plant 1. The guide mode is a mode in which the output processing part 430 provides a control value to the water treatment control device 2, and the control value is provided or displayed in a readable state or in a readable form so that the water treatment control device 2 determines whether to apply the control value. In the guide mode, the control value may be provided or displayed to an operator of the water treatment control device 2, so that whether to apply the control value may be determined by a user input. The hold mode is a mode in which the output processing part 430 converts a control value according to a control period of the water treatment control device and a control range in each control period, but the control value resulting from conversion is not provided to the water treatment control device. In the stop mode, the control mode management part 420 does not provide a control value to the output processing part 430, so the output processing part 430 cannot provide the control value to the water treatment control device 2 in the stop mode.

Figure 9:
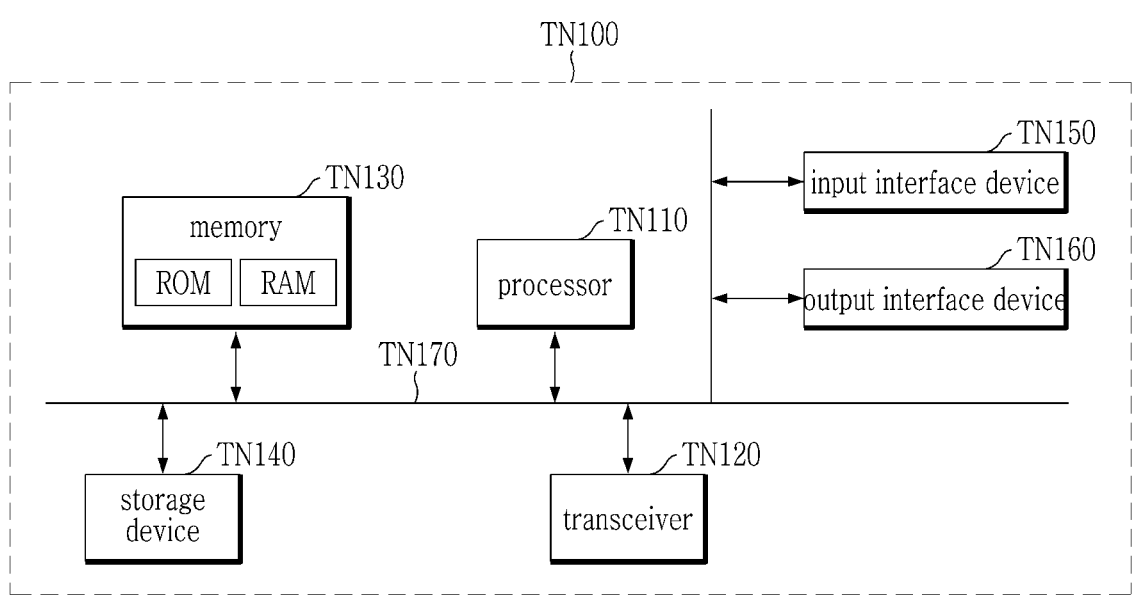
FIG. 9 is a diagram illustrating a computing device according to an embodiment of the present disclosure.

FIG. 9 is a diagram illustrating a computing device according to an embodiment of the present disclosure. A computing device TN100 may be the device or apparatus (for example, the water treatment control device 2 and the chemical dosing optimization apparatus 3) described in the present specification.

In the embodiment of FIG. 9, the computing device TN100 may include at least one processor TN110, a transceiver TN120, and a memory TN130. Furthermore, the computing device TN100 may include a storage device TN140, an input interface device TN150, and an output interface device TN160. The elements included in the computing device TN100 may be connected to each other via a bus TN170 to communicate with each other.

The processor TN110 may execute program commands stored in either the memory TN130 or the storage device TN140 or both. The processor TN110 may mean a central processing unit (CPU), a graphics processing unit (GPU), or a dedicated processor for performing the methods according to the embodiments of the present disclosure. The processor TN110 may be configured to realize the described procedures, functions, and methods related to the embodiments of the present disclosure. The processor TN110 may control each element of the computing device TN100.

Each of the memory TN130 and the storage device TN140 may store therein various types of information related to the operation of the processor TN110. Each of the memory TN130 and the storage device TN140 may be provided as either a volatile storage medium or a non-volatile storage medium or both. For example, the memory TN130 may be either a read only memory (ROM) or a random access memory (RAM) or both.

The transceiver TN120 may transmit or receive wired signals or wireless signals. The transceiver TN120 may be connected to a network to perform communication.

In the meantime, the various methods according to the above-described embodiments of the present disclosure may be implemented in the form of programs readable through various computer means and recorded on a computer-readable recording medium. Herein, the recording medium may include program commands, data files, data structures, and the like separately or in combinations. The program commands to be recorded on the recording medium may be specially designed and configured for embodiments of the present disclosure or may be well-known to and be usable by those skilled in the art of computer software. Examples of the recording medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. Examples of the program instructions include not only a mechanical language formatted by a compiler but also a high level language that may be implemented by a computer using an interpreter, and the like. The hardware devices may be configured to be operated by one or more software modules or vice versa to conduct the operation according to the present disclosure.

Although the embodiments of the present disclosure have been described, those skilled in the art will appreciate that addition, change, or deletion of elements may modify and change the present disclosure in various ways without departing from the spirit and scope of the present disclosure disclosed in the claims, and such modifications and changes also fall within the scope of the present disclosure. Also, it is noted that any one feature of an embodiment of the present disclosure described in the specification may be applied to another embodiment of the present disclosure.

The invention claimed is:

1. A water treatment system comprising:
a water treatment plant treating water using a chemical agent, the water treatment plant comprising at least one of a dissolved air flotation (DAF) device, an automatic strainer (AS), an ultrafiltration (UF) device, and a reverse osmosis (RO) device;
a water treatment control device, coupled with the water treatment plant, configured to control the water treatment plant based on a chemical dosage control value;
an apparatus for optimizing the chemical dosage control value; and
a transceiver,
wherein the apparatus comprising:
a chemical dosing management part configured to
repeatedly receive, via the transceiver, real-time data from the water treatment plant during successive control periods,
analyze the real-time data to determine a control mode of chemical dosing optimization, the control mode being selected from among a group comprising an auto mode, a guide mode, and a hold mode, and
provide the determined control mode as a management command;
a chemical dosing optimization part configured to analyze the real-time data to derive the chemical dosage control value such that the chemical dosage control value is to set a minimum of a chemical dosage to be dosed in the water while a sensed value of treated water of the water treatment plant is maintained in a predetermined normal value range; and
a chemical dosing output control part configured to provide the chemical dosage control value, via the transceiver, to the water treatment control device that controls the water treatment plant, according to the control mode of the management command,
wherein the chemical dosing output control part is further configured to:
correct the chemical dosage control value;
reset the control mode; and
provide the corrected chemical dosage control value to the water treatment control device according to the reset control mode,
wherein the chemical dosing output control part resets the control mode by
comparing real-time data received for a previous control period of the successive control periods with real-time data received for a current control period of the successive control periods and
resetting the control mode to the hold mode in response to occurrence of a difference of a preset threshold or greater,
wherein the water treatment control device controls the water treatment plant to inject the chemical agent into the water treatment plant according to the chemical dosage control value and the control mode.

2. The water treatment system of claim 1, wherein the chemical dosing output control part is configured to convert the chemical dosage control value according to a duration of each of the successive control periods and a control range in each of the successive control periods, and provide the converted chemical dosage control value to the water treatment control device.

3. The water treatment system of claim 1, wherein, if the control mode is the guide mode, the chemical dosing output control part is configured to reset the control mode according to a previous control mode and whether the chemical dosage control value is in a normal update state,
wherein the normal update state refers to a state in which the chemical dosage control value is consistently refreshed or updated during each control period without any instance of the value not being refreshed or updated.

4. The water treatment system of claim 1, wherein, if the control mode is the auto mode, the chemical dosing output control part is configured to apply the chemical dosage control value automatically to the water treatment control device.

5. The water treatment system of claim 1, wherein, if the control mode is the guide mode, the chemical dosing output control part is configured to provide the chemical dosage control value to the water treatment control device, the chemical dosage control value being provided in a readable state so that the water treatment control device determines whether to apply the chemical dosage control value.

6. The water treatment system of claim 1, wherein, if the control mode is the hold mode, the chemical dosing output control part is configured to convert the chemical dosage control value according to a duration of each of the successive control periods and a control range in each of the successive control periods, but do not provide the converted chemical dosage control value to the water treatment control device.

7. The water treatment system of claim 1, wherein the chemical dosing output control part is configured to, in response to receiving a correction bias value, correct the chemical dosage control value according to the correction bias value.

8. The water treatment system of claim 1, wherein the chemical dosage control value is derived by using a water treatment model which is a trained artificial neural network.

9. A water treatment system comprising:
a water treatment plant treating water using a chemical agent, the water treatment plant comprising at least one of a dissolved air flotation (DAF) device, an automatic strainer (AS), an ultrafiltration (UF) device, and a reverse osmosis (RO) device;
a water treatment control device, coupled with the water treatment plant, configured to control the water treatment plant based on a chemical dosage control value;
an apparatus for optimizing the chemical dosage control value; and
a transceiver,
wherein the apparatus comprising:
a chemical dosing optimization part configured to derive the chemical dosage control value such that the chemical dosage control value is to set a minimum of a chemical dosage to be dosed in the water while a sensed value of treated water of the water treatment plant is maintained in a predetermined normal value range; and
a chemical dosing output control part configured to provide the chemical dosage control value, via the transceiver, to the water treatment control device that controls the water treatment plant, according to a control mode, the control mode being selected from among a group comprising an auto mode, a guide mode, and a hold mode,
wherein the chemical dosing output control part resets the control mode by
comparing real-time data received for a previous control period of the successive control periods with real-time data received for a current control period of the successive control periods and
resetting the control mode to the hold mode in response to occurrence of a difference of a preset threshold or greater,
wherein the water treatment control device controls the water treatment plant to inject the chemical agent into the water treatment plant according to the chemical dosage control value and the control mode.

10. The water treatment system of claim 9, wherein the chemical dosing output control part is configured to convert the chemical dosage control value according to a duration of each of the successive control periods and a control range in each of the successive control periods, and provide the converted chemical dosage control value to the water treatment control device.

11. The water treatment system of claim 9, wherein the chemical dosing output control part is configured to reset the control mode according to a previous control mode and whether the chemical dosage control value is in a normal update state,
wherein the normal update state refers to a state in which the chemical dosage control value is consistently refreshed or updated during each control period without any instance of the value not being refreshed or updated.

12. The water treatment system of claim 9, wherein the chemical dosing output control part is configured, if the control mode is the guide mode, to provide the chemical dosage control value to the water treatment control device, the chemical dosage control value being provided in a readable state so that the water treatment control device determines whether to apply the chemical dosage control value.

13. The water treatment system of claim 9, wherein the chemical dosage control value is derived by using a water treatment model which is a trained artificial neural network.

14. A method for controlling output in a water treatment plant treating water using a chemical agent, the water treatment plant comprising at least one of a dissolved air flotation (DAF) device, an automatic strainer (AS), an ultrafiltration (UF) device, and a reverse osmosis (RO) device, the method comprising:
repeatedly receiving, by a chemical dosing management part, real-time data from the water treatment plant during successive control periods;
analyzing, by the chemical dosing management part, the real-time data to determine a control mode of chemical dosing optimization, the control mode being selected from among a group comprising an auto mode, a guide mode, and a hold mode;
analyzing, by a chemical dosing optimization part, the real-time data to derive a chemical dosage control value such that the chemical dosage control value is to set a minimum of a chemical dosage to be dosed in the water while a sensed value of treated water of the water treatment plant is maintained in a predetermined normal value range;
providing, by a chemical dosing output control part, the chemical dosage control value to a water treatment control device that controls the water treatment plant, according to the control mode; and
controlling the water treatment plant to inject the chemical agent into the water treatment plant according to the chemical dosage control value and the control mode,
wherein the providing of the chemical dosage control value to the water treatment control device comprises:
correcting the chemical dosage control value;
resetting the control mode; and
providing the corrected chemical dosage control value to the water treatment control device according to the reset control mode,
wherein the resetting the control mode comprises:
comparing real-time data received for a previous control period of the successive control periods with real-time data received for a current control period of the successive control periods and
resetting the control mode to the hold mode in response to occurrence of a difference of a preset threshold or greater.

15. The method of claim 14, wherein in the providing of the chemical dosage control value to the water treatment control device comprises:
converting the chemical dosage control value according to a duration of each of the successive control periods and a control range in each of the successive control periods, and providing the converted chemical dosage control value to the water treatment control device.

16. The method of claim 14, wherein the resetting of the control mode comprises:
if the control mode is the guide mode, resetting the control mode according to a previous control mode and whether the chemical dosage control value is in a normal update state,
wherein the normal update state refers to a state in which the chemical dosage control value is consistently refreshed or updated during each control period without any instance of the value not being refreshed or updated.

17. The method of claim 14, wherein the providing of the chemical dosage control value to the water treatment control device comprises:
- if the control mode is the auto mode, applying the chemical dosage control value automatically to the water treatment control device, or
- if the control mode is the guide mode, providing the chemical dosage control value to the water treatment control device, the chemical dosage control value being provided in a readable state so that the water treatment control device determines whether to apply the chemical dosage control value, or
- if the control mode is the hold mode, converting the chemical dosage control value according to a duration of each of the successive control periods and a control range in each of the successive control periods, but does not provide the converted chemical dosage control value to the water treatment control device.

18. The method of claim 14, wherein the chemical dosage control value is derived by using a water treatment model which is a trained artificial neural network.

* * * * *